(No Model.)

E. DE MOULIN.
CAMERA ATTACHMENT.

No. 480,808. Patented Aug. 16, 1892.

Witnesses
Jas. K. M'Lathron
H. P. Riley

Inventor
E. De Moulin
By his Attorneys,
C. A. Snow & Co.

UNITED STATES PATENT OFFICE.

EDMUND DE MOULIN, OF GREENVILLE, ILLINOIS.

CAMERA ATTACHMENT.

SPECIFICATION forming part of Letters Patent No. 480,808, dated August 16, 1892.

Application filed March 30, 1892. Serial No. 427,039. (No model.)

*To all whom it may concern:*

Be it known that I, EDMUND DE MOULIN, a citizen of the United States, residing at Greenville, in the county of Bond and State of Illinois, have invented a new and useful Camera Attachment, of which the following is a specification.

The invention relates to improvements in attachments for cameras.

The object of the present invention is to provide for cameras an attachment which will enable plates to be re-exposed to take the same person or object in different positions and for kindred purposes without showing a light or division line and without necessitating double printing, vignetting, and the like.

The invention consists in the construction and novel combination and arrangement of parts hereinafter fully described, illustrated in the accompanying drawings, and pointed out in the claim hereto appended.

Figure 1:
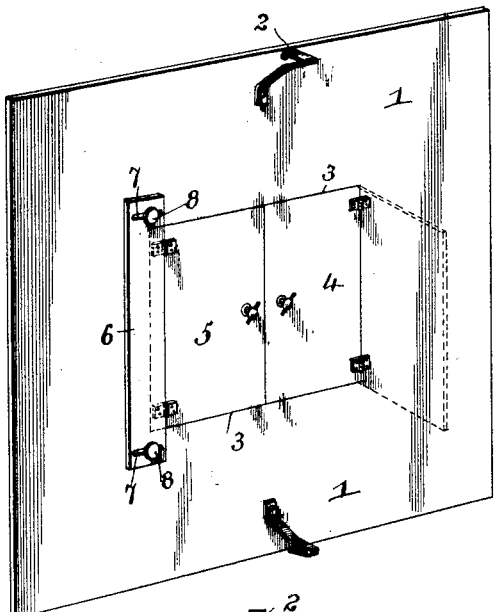
Figure 2:
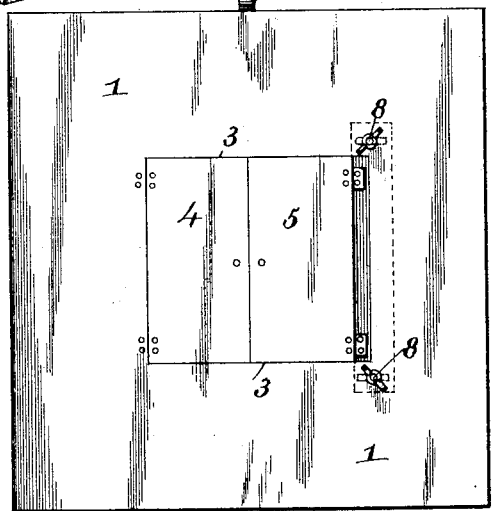
Figure 3:
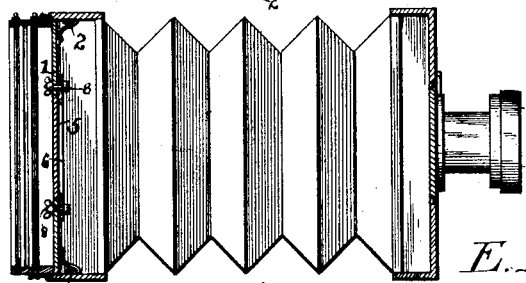

In the drawings, Figure 1 is a perspective view of a camera attachment constructed in accordance with this invention. Fig. 2 is an elevation of the same. Fig. 3 is a longitudinal sectional view of a camera, showing the attachment applied thereto.

Like numerals of reference indicate corresponding parts in all the figures of the drawings.

1 designates a plate adapted to be secured to the back of a camera by spring-catches 2 and provided with a central rectangular opening 3, adapted to be closed or partially closed by doors 4 and 5, hinged at opposite sides of the opening 3. The door 5 is hinged to an adjustable plate 6, which is provided at its end with transverse slots 7, and which is secured in its adjustment by set-screws 8, arranged in its slots.

The attachment is secured at the back of a camera by the spring-catches engaging the top and bottom of the same. One of the doors is opened and the person or object to be photographed is focused, and the plate to be exposed is placed in the camera and exposed through the open door. The plate is then removed, the open door is closed, and the other door is opened for focusing the person or object in the second position. The sensitized plate, which has been partially exposed, is replaced in the camera and again exposed. By this construction there is no line or division indicating separate exposures.

I desire it to be understood that I do not limit myself to the precise details of construction herein shown and described, as I may without departing from the spirit of the invention make minor changes therein, such as employing sliding doors instead of swinging ones. Instead of slotting the adjustable plate, the shifting of the door 5 could be accomplished by slotting the leaves of the hinges which are secured to the adjustable plate.

One of the doors is made adjustable on account of the sensitive plate being from onehalf to three-quarters of an inch from the attachment, and when a wide-angle lens is employed it is necessary to have the doors, so that they will close past each other a little, whereby a strip of plate is practically left unexposed and a line of light indicating separate exposures is avoided. The wider the angle of the lens the more the doors must close past each other, and the longer the focus the farther apart they must be.

What I claim is—

A camera attachment comprising the plate 1, designed to be secured to the back of a camera and provided with an opening, an adjustable plate provided with slots and arranged at one side of the opening, set-screws arranged in the slots and securing the adjustable plate in its adjustment, and doors hinged at opposite sides of the opening, one of the doors being hinged to and carried by the adjustable plate, substantially as described.

In testimony that I claim the foregoing as my own I have hereto affixed my signature in the presence of two witnesses.

EDMUND DE MOULIN.

Witnesses:
C. C. GARTEL,
LEV. E. GENRE.